Figure 1:
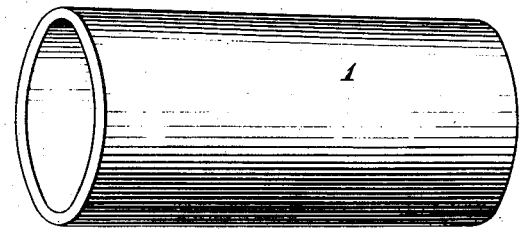

E. R. GILL.
METHOD FOR MAKING A PISTON PACKING RING.
APPLICATION FILED OCT. 29, 1913.

1,186,980.

Patented June 13, 1916.

WITNESSES
G. V. Rasmussen
Elmer Shirlyoung

INVENTOR
EDWIN R. GILL
BY
ATTORNEYS

UNITED STATES PATENT OFFICE.

EDWIN R. GILL, OF YONKERS, NEW YORK, ASSIGNOR OF ONE-HALF TO LYMAN E. WARREN, OF NEW YORK, N. Y.

METHOD FOR MAKING A PISTON PACKING-RING.

1,186,980.  Specification of Letters Patent.  Patented June 13, 1916.

Application filed October 29, 1913. Serial No. 797,993.

*To all whom it may concern:*

Be it known that I, EDWIN R. GILL, a citizen of the United States, and resident of Yonkers, Westchester county, New York, have invented certain new and useful Improvements in a Method for Making a Piston Packing-Ring, of which the following is a specification.

My invention relates to a method for making what is commonly known as a piston packing ring for pistons of steam engines, automobile engines, pumps and other devices driven by steam, combustion gases, compressed air or the like. Rings of the general class referred to are well known and are usually inserted in a peripheral groove or grooves formed in the piston. Such rings are usually discontinuous and tend to expand so as to constantly contact with the interior of the cylinder as they gradually wear away in operation. The purpose of these rings is to maintain at all times a tight fit between the piston and cylinder, thus preventing any leakage past the piston of the steam, air or other motive fluid which may be used.

The particular object of my invention herein described is to provide a method of making a piston ring which shall be easy and inexpensive to follow and will result in a ring having the good qualities of piston rings heretofore known, including a very considerable expansion, as wear takes place, with a negligible leakage of motive fluid past the ring.

Many piston rings heretofore known, while very effectually preventing leakage, have been very difficult and expensive to make. Other rings, while perhaps simple to make, have only imperfectly prevented leakage. A piston ring is, as will be seen, very easy to make if made according to the method disclosed herein and will, at the same time, constitute a substantially perfect bar to the passage of motive fluid across its plane.

My invention will be better understood by referring to the drawings, in which—

Figure 2:
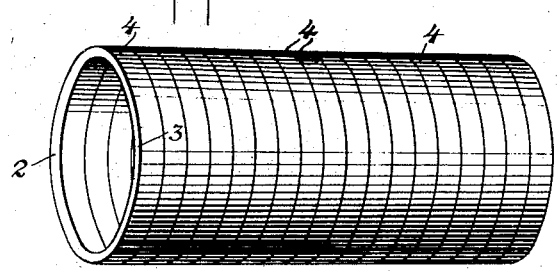
Figure 6:
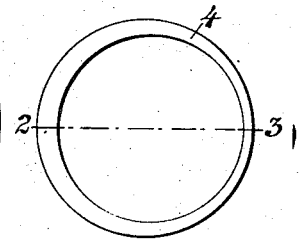
Figure 3:
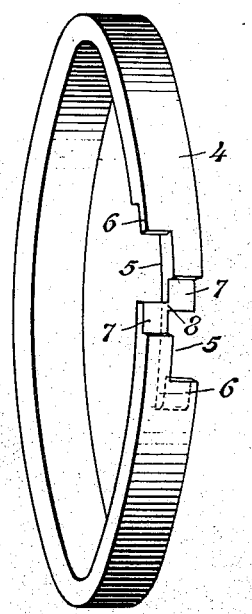
Figure 4:
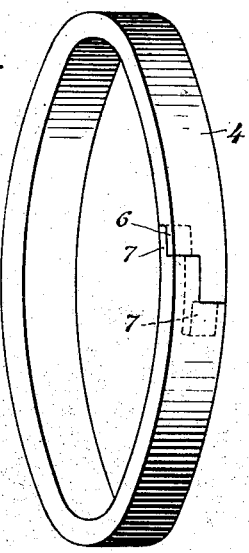
Figure 5:
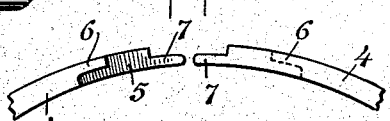

Figure 1 represents a piece of steel tubing which is to be converted into the packing rings of my invention; Fig. 2 represents the tubing of Fig. 1 after it has been bored out and sawed; Fig. 3 represents one of the rings sawed from Fig. 2 after the excess of metal has been removed, but before it has been divided; Fig. 4 represents the ring of Fig. 3 after it has been divided and closed so as to have a final finishing cut made; Fig. 5 is a detail showing the ends of the ring after completion but fully opened so that the character of said ends may be clearly understood and Fig. 6 represents an end view of the bored cylinder of Fig. 2.

Referring to the drawings, a suitable length of steel tubing 1 constitutes the stock from which my improved rings are made. The wall thickness of this tube should be somewhat greater than the final radial thickness of the completed ring at its thickest point. I first take this ring and bore it out eccentrically so that its wall thickness decreases continuously from a maximum at one end 2, of a diameter, to a minimum at the other end 3, of the same diameter. Parallel rings 4 of suitable width are then sawed from the cylinder. Each ring 4 is then suitably held in a milling machine and two segments of equal length, of width half that of the ring and having their sides parallel to the plane of the ring are removed from opposite sides of said ring thereby leaving spaces 5—5. These segments are offset peripherally with reference to one another so that one segment begins where the other ends. A milling cutter is then used to mill away a portion of the underside of the ring at the remote ends of each space 5; these two portions are of equal length. This cut away portion extends to the median place of the ring and leaves an overhanging tongue 6, the radial thickness of which is about half that of the ring itself. The ring is then shifted so that a milling cut may be taken from the outside of the ring and parallel to the axis thereof, so as to remove a segment from each end of the ring and thereby leave underhung tongues 7—7. The peripheral length of each segment is the same as the length of the tongues 6—6 and the depth of the portion removed is about half that of the entire ring. The ring is now united only by a narrow bit of metal at the junction 8 of tongues 7—7. By use of a fine metal saw the ring may be sliced across at this point so that its ends are free of one another. The ring is then pressed together as shown in Fig. 4 the tongues 6—6 overhanging and sliding upon tongues 7—7. If the lengths of the several removed segments have been properly chosen, the entire ring will close together as shown in Fig. 4, but inasmuch as compression has been required to effect this closure, the ring will tend to open. While held in this closed condition a finishing cut is applied to the periphery of the ring and it is turned to a true cylinder so as to have a diameter very slightly less than that of the cylinder in which the piston is to travel. The ring is then inserted into the piston groove provided for it and the piston fitted to the cylinder; the ring will thereupon expand so as to accurately engage said cylinder peripherally at all points.

It will be seen that, when the piston ring is in place on the piston, and in the cylinder, there is a perfect overlapping of ring ends both as respects a radial direction and as respects the plane of the ring. This overlapping continues for a very considerable expansion of the ring so that a large amount of wear may take place, and the ring open up accordingly, before it will be possible for steam or other motive fluid to pass across the plane of the ring and thus leak out of that portion of the cylinder in which it is required to be retained.

As described and shown, one pair of coöperating tongues 6 and 7 is equal in width to the other pair. It is obvious, however, that the operation and functions of the ring remain the same even though the width of one pair of tongues be different from that of the other pair. It is only necessary that one member of each pair of coöperating tongues have the same width as the other member. While, furthermore, it is necessary that the two members of each coöperating tongues have the same length it is not strictly necessary that said length be the same as the length of the coöperating tongues of the other pair.

Having described my invention, I claim:

The method of making a piston packing ring which comprises taking a straight metal cylinder, boring out said cylinder circularly but eccentrically, cutting said bored cylinder in parallel transverse planes, removing parallel angularly offset segments from opposite sides of said ring so as to leave offset spaces on opposite sides, removing portions from the inside of the ring at the remote ends of said opposite spaces so as to provide overhung tongues, removing an outer segment from the ring midway between said overhung tongues so as to provide underhung tongues, then cutting the ring across the junction of the underhung tongues, and finally closing the ring ends together and finishing the exterior of the ring to a true circle.

In testimony whereof I have hereunto set my hand in the presence of two subscribing witnesses.

EDWIN R. GILL.

Witnesses:
ELMER G. WILLYOUNG,
FRITZ ZIEGLER, Jr.